May 12, 1925.  1,537,179
J. A. L. MÖLLER
MACHINE FOR TESTING RIBBONS AND CARBON PAPER
Filed Feb. 4, 1924   3 Sheets-Sheet 1

INVENTOR
JACOB A. L. MÖLLER.
BY
Newell & Spencer
ATTORNEY

May 12, 1925.
J. A. L. MÖLLER
1,537,179
MACHINE FOR TESTING RIBBONS AND CARBON PAPER
Filed Feb. 4, 1924
3 Sheets-Sheet 2
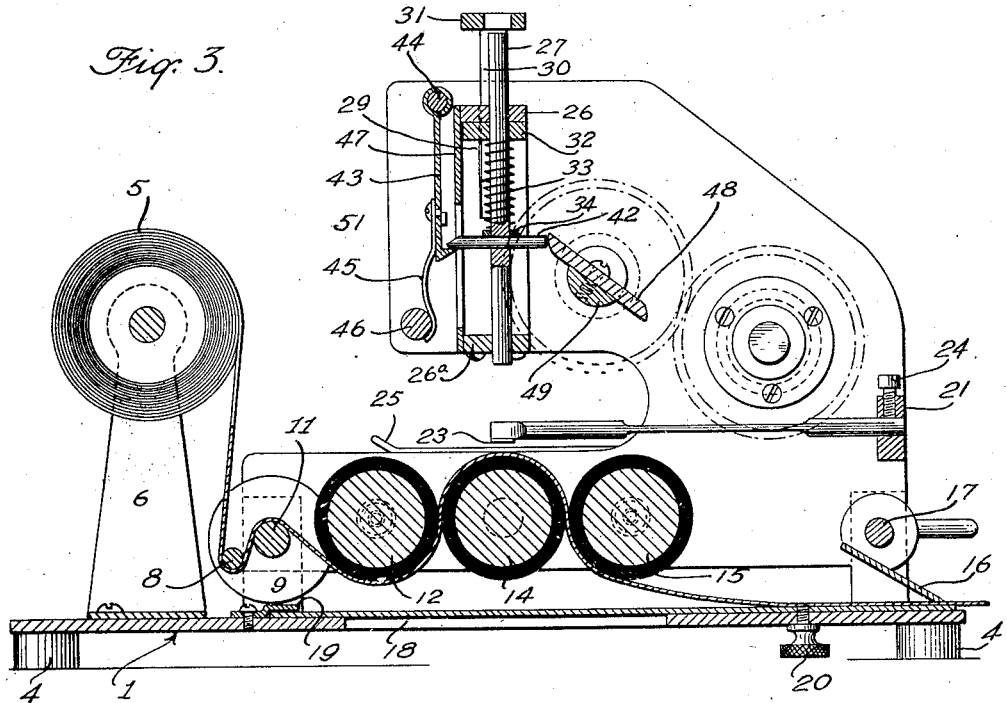
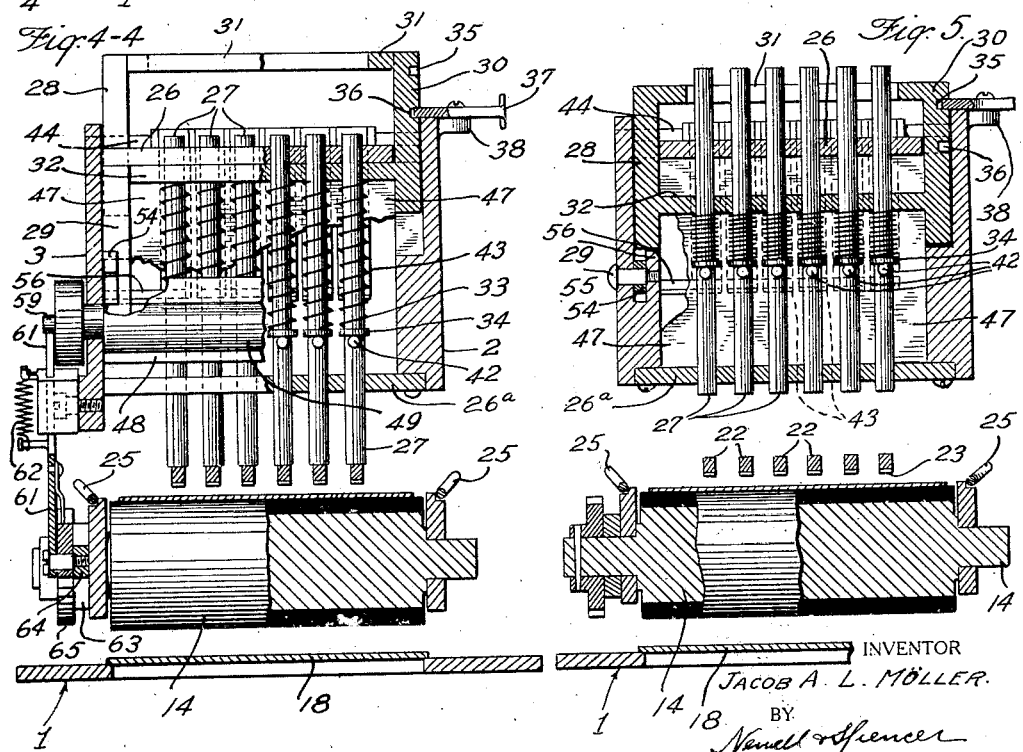
INVENTOR
JACOB A. L. MÖLLER.
BY
ATTORNEY

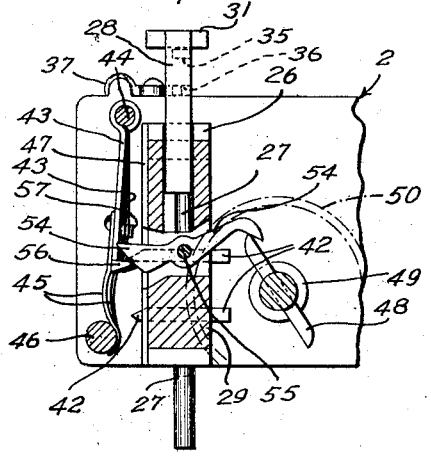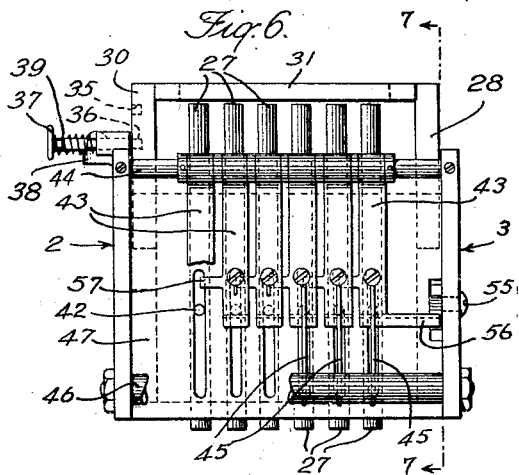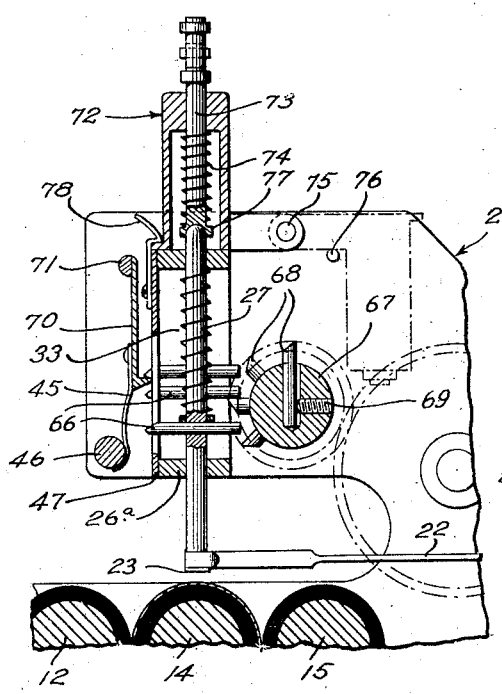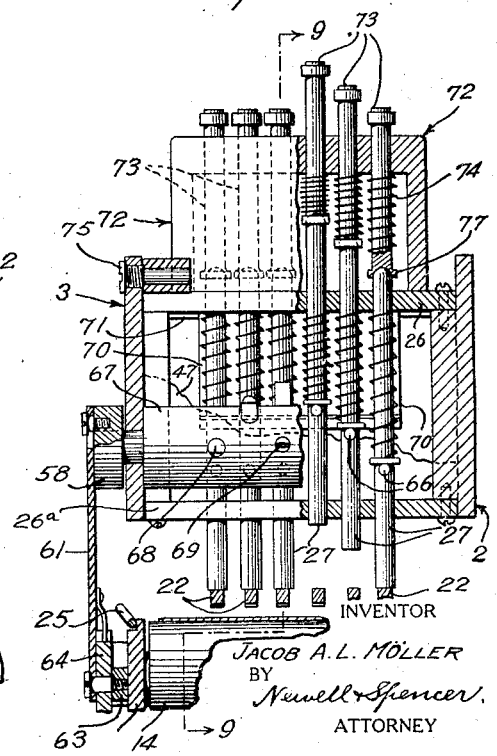

Patented May 12, 1925.

1,537,179

UNITED STATES PATENT OFFICE.

JACOB A. L. MÖLLER, OF NEW YORK, N. Y., ASSIGNOR TO STANDARD PRODUCTS CORPORATION, A CORPORATION OF NEW YORK.

MACHINE FOR TESTING RIBBONS AND CARBON PAPER.

Application filed February 4, 1924. Serial No. 690,462.

*To all whom it may concern:*

Be it known that I, JACOB A. L. MÖLLER, a citizen of the United States, residing at New York, in the county of New York and State of New York, have invented a certain new and useful Improvement in Machines for Testing Ribbons and Carbon Paper, of which the following is a clear, full, and exact description.

My invention relates to a machine for testing the quality of inking ribbons and carbon papers, and has for its object the provision of a machine of this type which is efficient and rapid in operation and simple in construction.

To test ribbons and carbon paper, it is customary to subject them to repeated blows of a type member or members, the type making an impression on paper, or other suitable means, through the ribbon or carbon paper to be tested. The character of the impressions and their number, together with the condition of the ribbon or paper after the test, gives an indication of the quality of the materials of which they are made, as well as the quality of the ink or carbon mixture used. Since carbon paper is usually made of tissue, while the inking ribbon is of much denser fabric, the intensity of percussive action to which the former may be subjected is far less than may be permitted in the case of the latter. Therefore, a percussive action suitable for testing carbon papers would be impractical for use in testing ribbons, because the number of impressions necessary to be made in the case of a ribbon would be very large.

A feature of my invention, therefore, is the provision of means whereby the percussive action of the printing means may be varied between definite limits; that is to say, with the machine in one adjustment the type is made to strike successive blows against the platen and therefore make an impression on the paper carried thereby through the material to be tested, each blow being of similar intensity. With the machine differently adjusted, the type is also caused to strike a succession of blows, each of similar intensity, but each blow struck with the changed adjustment is of a different intensity from that struck during the first adjustment.

Another feature of the invention relates to the construction of the mechanism for maintaining uniform intensity of the type blows during a succession or series of blows, whether the machine is in one adjustment or another, and regardless of the speed of the driving parts.

Further features and advantages will become apparent from the following description and claims when taken in connection with the accompanying drawings, in which:

Fig. 3 is a section on the line 3—3, Fig. 1;

Fig. 4 is a section, part of which is taken on the line 4—4 of Fig. 2, and another part on the line 4ª—4ª of Fig. 2;

Fig. 5 is substantially similar to Fig. 4, but with the hammer drivers in set position ready to be tripped;

Fig. 6 is a front elevation, with some parts broken away, of the hammer drivers and the latching means therefor;

Fig. 7 is a section on the line 7—7, Fig. 6;

Fig. 8 is a front elevation of a modified construction; and

Fig. 9 is a section on the line 9—9, Fig. 8.

Figure 1:
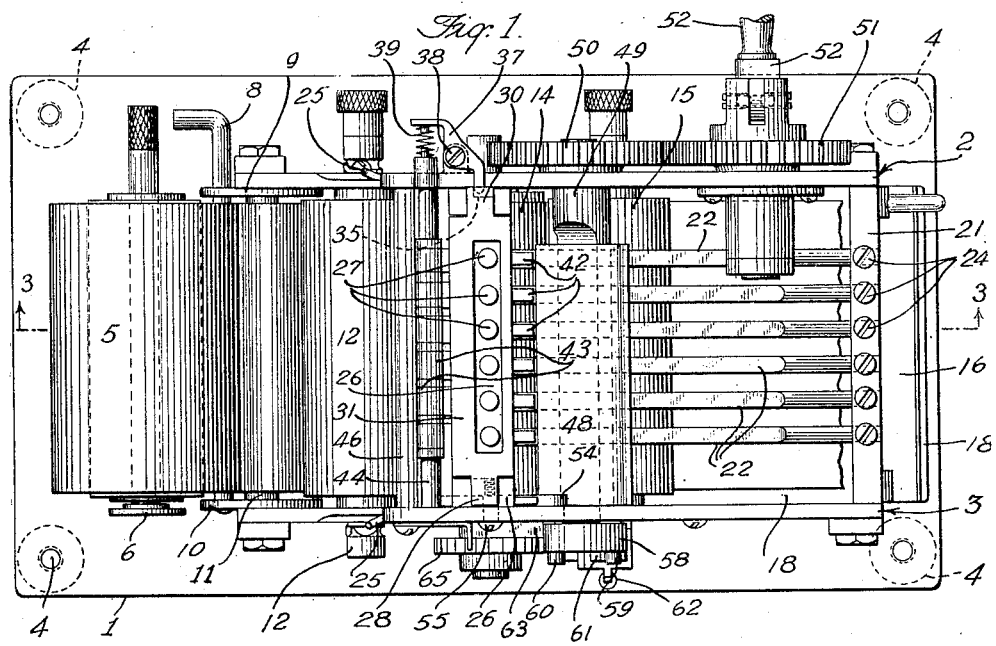
Fig. 1 is a plan view.
Figure 2:
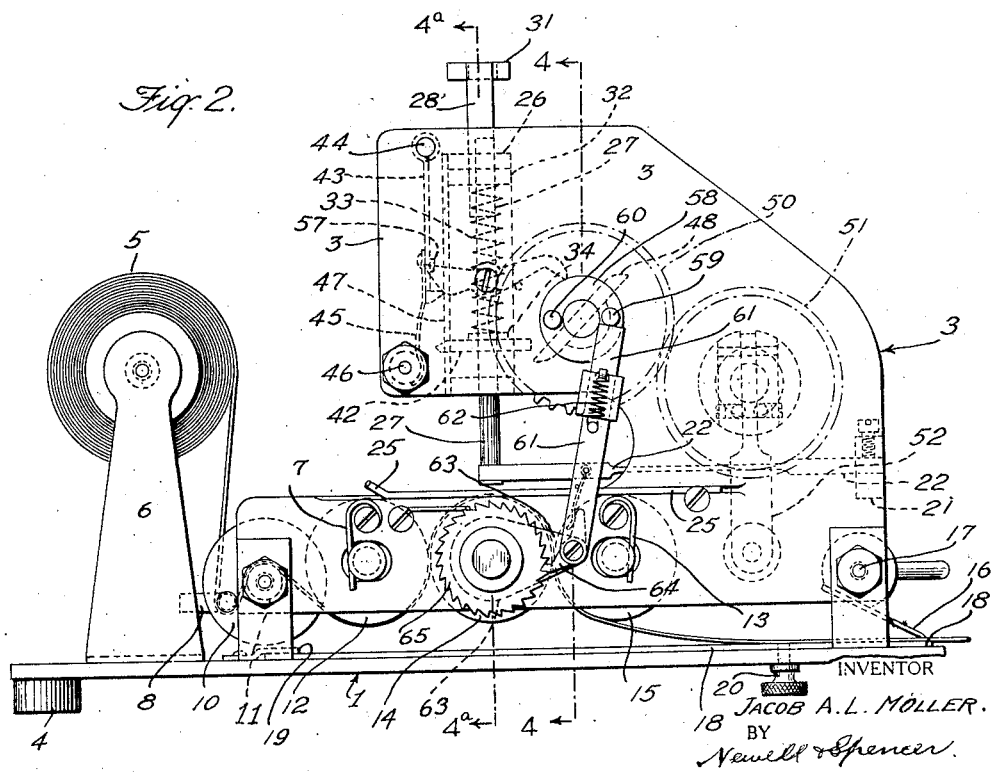
Fig. 2 is a left side elevation.

Referring to the drawings, 1 is the base plate, to which is secured a right side plate 2 and a left side plate 3. To the under portion of the base plate I secure feet 4 of rubber or similar material. The side plates support all of the parts of the machine, except the paper supply roller 5. This is supported at the rear of the operative parts of the machine by standards 6 secured directly to the base plate. The paper upon which the printing is done, passes from the supply roll 5 downwardly around a guiding pin 8, which passes through an aperture in a disk 9, secured just within the side plate 2, as shown in Fig. 1, and is screw-threaded into a disk 10 substantially similar to the disk 9 and secured to the inside of the side plate 3. Passing across from one side plate to the other is a guide rod 11, Fig. 3, over which the paper passes, and from thence it is led downwardly under pressure roller 12 and over the platen 14. It then passes downwardly guided by another pressure roller 15, and thence under the cutting edge 16, pivotally supported by a rod 17 engaging the side plates. The pressure rollers 12 and 15 engage elongated slots in the side plates 2 and 3, and springs 7 and 13, Fig. 2, act to urge their respective pressure rollers toward the platen, so that the paper is held in proper position for receiving type impressions. In order to facilitate threading of the paper over and under the guide rods and rollers, the base plate has a cut-out portion, as shown in Fig. 3, and a plate 18 is provided. The left end of this plate slips under a ledge 19 and its front end is provided with the screw-threaded aperture for the reception of the threaded end of a thumb screw 20. A crossbar extends between the side plates at the front of the machine or at the right, as shown in Figs. 1 and 3, which bar is apertured for the reception of individual type bars 22, each having a type 23 at its farther end. Screws 24 engaging in threaded openings in the bar 21 firmly secure the type bars in place. The type bars are preferably made of sufficient length and are sufficiently springy so that they normally lie substantially horizontally, as shown in Fig. 3, with the type clear of the paper and also clear of the material to be tested, whether this be a strip of carbon paper or an inking ribbon. During the test, such material is held stationary, over the paper supplied from the feed roll 5, by means of spring fingers 25, shown in Figs. 2 and 4, there being one finger on each side of the machine suitably secured to a respective side plate.

Secured to the side plates 2 and 3 near the top thereof is an apertured bar 26 resting on a ledge of each side plate. A similar bar 26ᵃ is secured to the side plates near the bottoms and a series of hammer drivers or plungers 27 are guided by the apertures and one spring urged in a downward direction. An adjustable frame is also provided which has a left side member 28, which passes through a notch cut in the guide bar 26 and is guided in its up-and-down movement by a channel piece 29 secured to or integral with the side plate 3. To complete the frame there is also provided a right side member 30 also guided by a notch in the right end of the bar 26, and a slotted crossbar 31 is secured to the upper ends of the side members 28 and 29. There is also a bottom crossbar 32 secured to the side members 28 and 30, which crossbar, in the normal position of the parts shown in Fig. 4, is just beneath the guide bar 26. The crossbar 32 is also slotted for the reception of the ends of the drivers or plungers 27. Each driver or plunger 27 is surrounded by a coiled spring 33, maintained in position by its upper end engaging the under side of the crossbar 32 and its lower end engaging a collar 34, Figs. 3 and 5, secured to the plunger. The frame, above referred to, may be moved from the position shown in Fig. 4 to the position shown in Fig. 5, and when in such position an increased amount of power is stored in all of the springs, and the amount of increase is the same for each. In order to hold the frame in either of its two positions, the right side member 30 is notched at 35 and 36, and there is a spring dog 37, pivoted to an ear 38, projecting from the side plate 2. A spring 39 tends to hold the dog in either notch. When the machine is to be used for testing carbon paper, the frame is positioned, as shown in Fig. 4, but when a ribbon is to be tested, the frame is pressed down and locked by the dog in the position shown in Fig. 5.

Situated below the collar 34 on each of the plungers is a pin 42 which projects beyond the forward side of the plunger, or the right side, as seen in Fig. 3, a sufficient distance to be in the path of a cam member by which the plunger is raised to set position. Each of the pins 42 passes through the plunger and each projects from the opposite side thereof a sufficient distance to be caught by suitable latching means. In the form of construction shown in Figs. 1 to 7, the latching means consists of a series of separate latches 43, each pivoted to a common supporting rod 44. A spring 45, one for each latch and having its lower end secured behind a rod 46, urges the latches into position to engage the pins 42. There is also provided a guide plate 47 having a series of narrow vertical slots, through which the pins 42 project and which prevent turning of the plungers on their own axes. The plungers normally occupy a position shown in Fig. 4, in which the pins thereof are free of the latches and the plungers rest upon the top of the type bars. Means are provided to move all the plungers simultaneously from the position shown in Fig. 4, to the position shown in Fig. 3, in which latter position each plunger or driver is caught and latched by a latch plate 43, and subsequently the latch plates are tripped, permitting all the plungers to descend under the action of their respective springs and deliver a sharp blow on the top of the type member.

The lifting means for the plungers consists of a cam bar 48 which is screwed, or otherwise fastened, to a semi-circular member 49 extending across the machine and having cylindrical bearings at its ends which pass through the side plates 2 and 3. On the right-hand bearing there is secured a gear 50, with which engages a similar gear 51 mounted on the operating shaft of the machine, which in the present case consists of a stub shaft to which is pivoted an operating handle 52. The number of teeth on the gears 50 and 51 are shown as equal, thus giving a ratio of 1:1, although other ratios may be employed. As the member 49 rotates in a clockwise direction, one edge of the cam bar 48 engages all of the pins 42, thereby lifting the plungers to a position shown in Fig. 3, where they are engaged by the latching means. As the bar cam 48 passes by the pins, its edge engages one end of a dog 54 pivoted at 55 on the right side of the machine, Fig.

6. The opposite end of this dog engages a finger 56 projecting to the right from the right-hand latch plate 43, as shown in Fig. 6, causing said latch plate to move outwardly as shown in Fig. 7, and thereby release its plunger. Each latch plate, except the one to the extreme left, has a lip 57 which projects behind the latch plate immediately adjacent it, to the left. Therefore, when the latch plate at the extreme right is tripped, it results in successively tripping the latch plates to the left, so that all of the drivers are released very quickly but in successive order. The bar cam 48 is wide enough, so that during a single rotation of the member 49 the latches are tripped twice, once by each cam edge of the bar.

In order to feed the paper between each impression of the type, the left-hand bearing of the member 49, which projects through the left side plate 3, has secured to it a disk 58. This disk carries two pins 59 and 60 which are so placed in relation to the bar 48 that just after the type drivers are tripped, one of these pins engages the top of a pawl-carrying slide and moves it downwardly against the action of a spring 62. The bar 61 slides in a guideway, which is pivoted to the side plate 3 to permit slight rocking of the slide 61. At its lower end, said slide is pivoted to a lever 63 pivoted to the platen roller shaft. A pawl 64 is also pivoted near the end of the slide bar 61, and is spring-pressed in such manner that its lower end engages a ratchet wheel 65, secured to the roller platen, whereby the paper is fed a sufficient distance to bring a fresh surface under the printing type. From this construction it is obvious that the paper is fed twice during each rotation of the member 49.

In Figs. 8 and 9, I have shown a modified construction in which the setting and tripping of the type drivers is somewhat differently done. In this construction, the drivers are successively moved to set position and successively tripped, although in this form of construction the tripping of one driver is brought about during the setting of the succeeding driver. As in the preferred form, there are pins 66 extending through the drivers, these pins corresponding in construction and in function to the pins 42. The means for setting the pins takes the form of a drum 67 having bearings extending through the side plates 2 and 3, as previously described, the right-hand bearing having a gear mounted thereon, and the left-hand bearing having a disk similar to 58 but with only a single pin thereon similar to one of pins 59 or 60. Preferably I make the gear ratio between the driving and driven gears, 2 to 1, although other ratios may, of course, be used. The drum 67 is provided with a series of pins 68, spirally arranged and held in set position by screws 69. As the drum 67 rotates, a driver is moved to set position by a pin 68, and is caught by latching means, which in this form of construction consists of a single latch plate 70 pivoted at 71 and spring-urged to position to engage the ends of the pins 66. When the first of the series of pins 68 engages and lifts a driver and said driver is caught by the latch plate 70, then when a succeeding pin moves a driver to set position, the pin 66 cams the latch plate 70 outwardly to an extent sufficient to release the previously set driver, which latter then moves under action of its spring to cause printing from the type situated underneath it.

I have also shown in Figs. 8 and 9 a modified construction of the means for increasing the tension of the type driving springs, although, of course, this form may be used in connection with the other constructions described in Figs. 1 to 7. Referring to Fig. 9, there is provided a hinged frame carrying a housing 72 which carries a series of supplemental plungers 73, each provided with a spring 74. Each spring bears against the upper side of the housing, and its lower end is provided with a cap 77 having a concaved under portion which fits over the top of the driver 27 when the frame is in the full-line position shown in Fig. 9. The frame is pivoted about a rod 75, as shown in full lines. Its inoperative position is shown in dotted lines in said figure. A pin 76 acts as a stop to limit it in this position. A detaining spring 78 holds the frame in operative position and then the power of the springs 74 is added to that of the springs 33.

It is obvious that the means for increasing the tension of the springs 33, which has been described in connection with Figs. 1 to 7, may be used in connection with the particular driver setting the tripping means, shown in Figs. 8 and 9.

It is obvious that other variations may be resorted to, within the scope of the invention, without departing from the principle thereof.

What I claim as new is:

1. In a testing machine, the combination with individual type and a platen against which the type may strike; of a plunger for each type, means for causing each plunger to deliver a succession of blows to said type of uniform intensity including a spring for each plunger, and means for applying supplemental spring pressure of a definite intensity to each of said plungers to definitely vary the intensity of the blows struck.

2. In a testing machine, the combination with individual type and a platen against which the type may strike, of a driver for each type, a spring for each driver, a series of supplemental springs, one for each driver, and means for causing said supplemental springs to effectively cooperate with said first mentioned springs to increase the percussive action of the drivers on the type.

3. In a testing machine, the combination with individual type and a platen against which the type may strike, of a series of plungers causing percussive action of said type, and means for varying the degree of percussive action comprising a frame, a series of supplemental spring actuated plungers carried by said frame, and means for causing said supplemental plungers to engage the first mentioned plungers and thereby increase the percussive action thereof.

4. In a testing machine, the combination with individual type and a platen against which the type may strike; of drivers for said type, a spring for each driver, an operative shaft, means operated therefrom for moving the drivers to set position to thereby store power in said springs, latching means for retaining the drivers in set position, and means operated by said shaft for causing tripping of said latching means.

5. In a testing machine, the combination with individual type and a platen against which said type may strike; of drivers for said type, a spring for each driver, rotatable cam means for setting said drivers to thereby store power in said springs, latching means for retaining said drivers in set position, and means operated by said rotatable cam means for tripping said latching means and for rotating the platen between printing strokes of the type.

Signed at New York city, New York, this 29th day of January, 1924.

JACOB A. L. MÖLLER.